June 22, 1954   G. F. KELK   2,681,565
MEANS FOR THRUST MEASUREMENT
Filed June 9, 1951   2 Sheets-Sheet 1
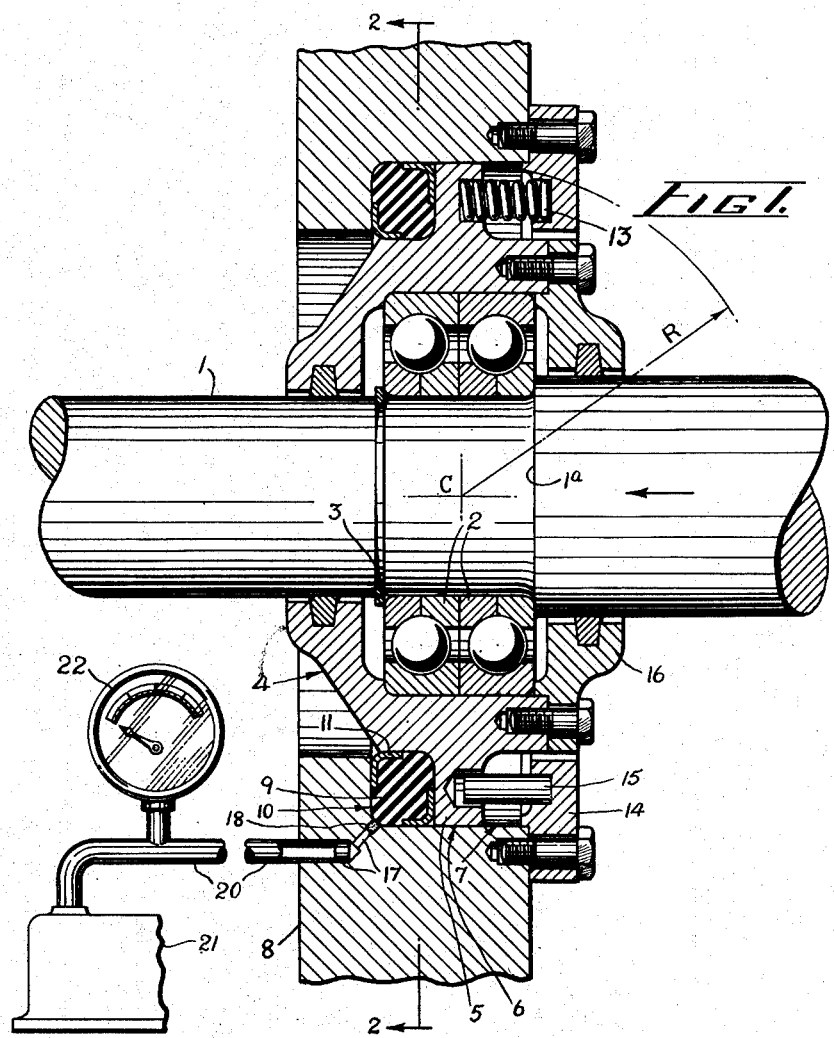
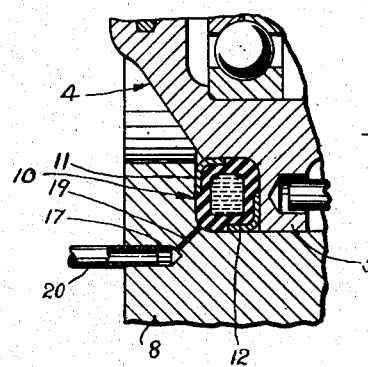
INVENTOR
G. F. KELK
PER
ATTORNEY June 22, 1954     G. F. KELK     2,681,565
MEANS FOR THRUST MEASUREMENT Filed June 9, 1951     2 Sheets-Sheet 2

INVENTOR
G.F.KELK
PER

*Gareth E. Maybee*
ATTORNEY

Patented June 22, 1954

2,681,565

UNITED STATES PATENT OFFICE 2,681,565

MEANS FOR THRUST MEASUREMENT

George Frederick Kelk, York Township, York County, Ontario, Canada, assignor to A. V. Roe Canada Limited, Malton, Ontario, Canada, a corporation Application June 9, 1951, Serial No. 230,723

6 Claims. (Cl. 73—140)

The invention relates to a means for thrust measurement and more particularly to a means for measurement of the axial thrust of the shaft on a thrust bearing.

In known constructions of thrust bearing, it has been proposed to provide means for the indication of the thrust on the bearing, consisting of a chamber filled with liquid and connected to a pressure gauge, the chamber being in the form of a piston and cylinder in some of these known constructions, and in others the chamber has a flexible diaphragm, the piston or diaphragm, as the case may be, being subject to the axial thrust on the bearing.

In some thrust bearings, especially those adapted to accommodate misalignment of the supported shaft, the thrust on the bearing is sustained by a body of rubber or rubber-like material, and the main object of the present invention is the provision of a simple yet efficient means for the measurement of the thrust on such a construction of bearing without the use of a specially provided liquid-filled chamber connected to a gauge.

In order that the above and further objects and advantages of the invention may be clearly understood, the invention will now be described with reference to the construction of thrust bearing illustrated in the accompanying drawings, in which:

Figure 1 is an axial section through a thrust bearing employing a thrust sustaining solid body of incompressible material which is deformable at normal temperatures;

Figure 3 is a fragmentary section of the thrust sustaining body illustrating a modified form having a liquid filled core.

Figure 2:
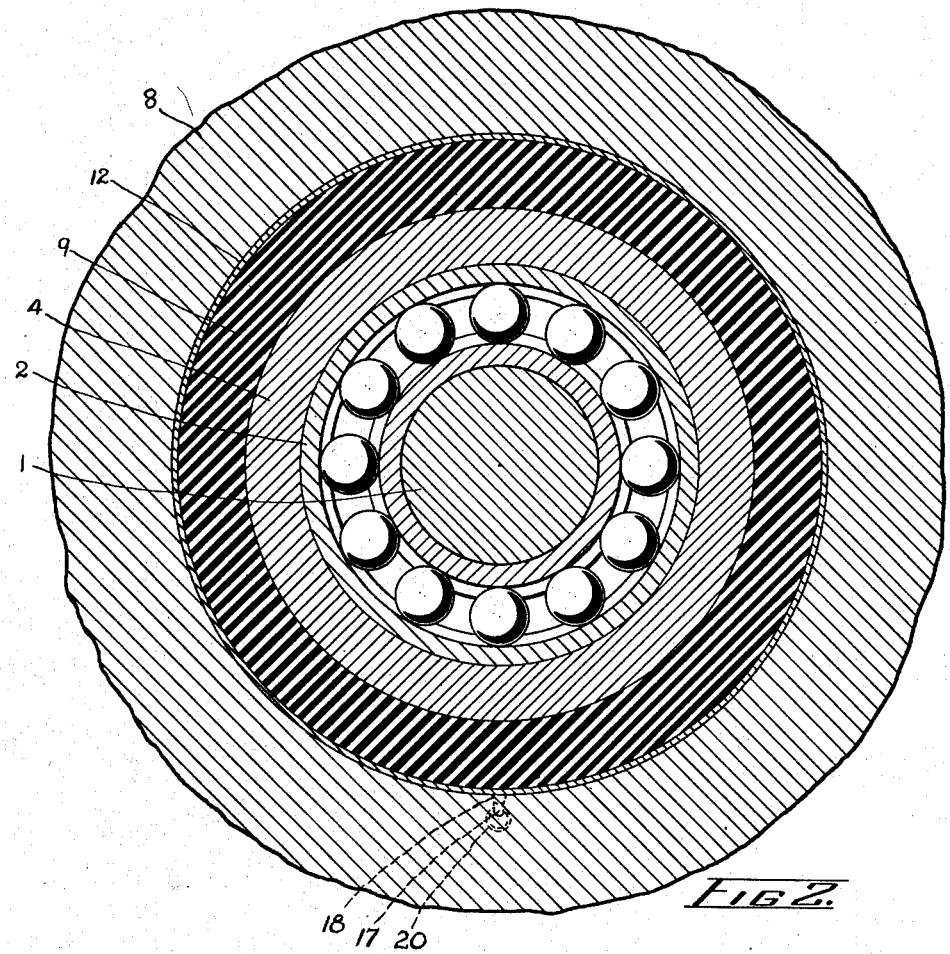
Figure 2 is a section at the line II—II in Figure 1.

The construction of thrust bearing illustrated in Figures 1 to 3 is generally similar to that described in United States patent specification No. 2,530,323. A rotatable shaft 1 is supported in ball bearings 2—2, the direction of thrust on the shaft being indicated by the arrow in Figure 1. The thrust is taken by the shoulder 1a which contacts with the side of the inner race of one of the bearings 2. The bearings are retained against this shoulder in conditions of slight reverse load by the spring clip 3. The outer non-rotary races of the bearings are mounted in a carrier constituting in this construction a shaft housing 4 embodying a flange 5 around its circumference, and the outer surface 6 of this flange is an arc having radius R, the center C of the said arc being at the point of intersection of the center line of flange 5 and the axis of the shaft 1. The housing 4 is shown supported radially in a cylindrical recess 7 in a fixed member constituting in this construction part of the frame 8 of the machine, the diameter of the recess being such as to furnish a sliding fit for the outer surface 6 of the flange 5.

On its thrust face the flange 5 is supported axially on a ring 9 composed of soft vulcanized rubber. The ring 9 is in turn supported axially on a shoulder 10 of the frame 8, the depth of the shoulder 10 being approximately equal to the width of the flange 5. The ring 9 completely fills the annular chamber bounded on the one hand by the floating housing 4 with its flange 5 and on the other hand by the cylindrical recess 7 and the shoulder 10, and it is reinforced by light L-section metal rings 11 and 12 along the lines of discontinuity between the two components, to prevent possible extrusion of the material of the ring 9 out of the chamber under load.

In the modification illustrated in Figure 3, the ring 9 consists of a hollow body of rubber with a liquid core. The liquid used is glycerine, but any other liquid may be used that is inert or does not react with the material of which the surrounding skin or casing is made.

Springs 13, the ends of which are supported in sockets in the flange 5 and a supporting ring 14, are provided at suitably spaced peripheral intervals to keep the housing 4 with its flange 5 and the frame 8 in contact with the ring 9 under conditions of slight reverse load. In addition, pins 15, fitting loosely in holes in the flange 5 and fitting tightly in the supporting ring 14, are provided at suitably spaced peripheral intervals to prevent the housing 4 from creeping in the direction of rotation of the shaft 1. The outer races of the bearings 2 are clamped in the housing 4 by a ring 16 incorporating an oil seal.

Thrust is transmitted from the shaft 1 directly through the non-self-aligning bearings 2 to the housing 4 and hence through the ring 9 to the frame 8 of the machine. Misalignment between the axis of the shaft 1 and the axis of the frame 8 is taken care of by the ring 9, which deforms allowing the housing 4 supporting the outer races of the bearings 2 to assume the correct position in relation to the inner races supported by the shaft 1. Since the ring 9 is composed of substantially incompressible material, and, moveover, since it is entirely confined, no appreciable axial displacement of the shaft 1 relative to the frame can occur.

In accordance with the present invention, a simple and efficient method and means are provided to enable the thrust on the bearing to be ascertained, and for this purpose, as illustrated in Figure 1, a duct 17 is drilled in the frame 8 opening at its inner end into the annular chamber filled by the ring 9. The inner end of the duct 17 is formed with a portion of larger diameter in which is mounted a porous plug 18 composed, for example, of sintered bronze. Alternatively, as illustrated in Figure 3, the inner end of the duct 17 may stop short of the chamber containing the ring 9 and be connected thereto by a small diameter jet 19; however, both the cross-sectional area of the jet 19 and the flow characteristics of the porous plug 18 are selected so that either the jet or plug constitutes a nozzle the aperture or apertures of which are sufficiently small to prevent extrusion therethrough of the material of the ring 9 under the pressure exerted by the thrust on the bearing. For example, if the pressure in the ring 9 is of the order of 700 pounds per square inch, then the jet 19 may be of .030 of an inch diameter. The duct 17 is connected by means of a tube 20 to a source of fluid under pressure, such as a pump 21. The tube 20 is also connected by means of a branch line to a pressure gauge 22.

When it is desired to ascertain the axial thrust exerted by the shaft 1 on the bearing, the pump 21 is actuated to pump fluid into the tube 20, and the increasing pressure in the tube 20, and hence at the nozzle constituted by the porous plug 18, or the jet 19, as indicated by the gauge 22, is observed. When this pressure reaches a maximum constant value this value is noted and actuation of the pump 21 is thereupon discontinued. It will be appreciated that in the type of thrust bearing under consideration, in which the thrust load is sustained by a solid body of incompressible material deformable at normal temperatures, this material assumes the flow characteristics of a liquid, and, therefore, the value at which the pressure at the nozzle (plug 18 or jet 19) balances the pressure in the ring 9 is the same as the value of the pressure on the thrust face of the flange 5. Knowing this pressure, the thrust on the bearing can be readily calculated. Alternatively, the gauge 22 may be suitably calibrated to give a direct reading of the thrust.

Figure 4:
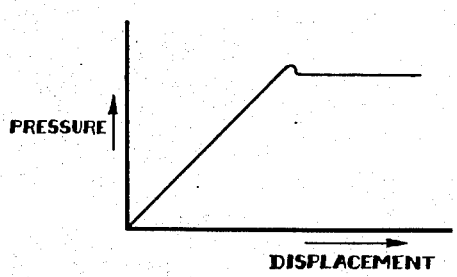
Figure 4 is a graph illustrating the pressures involved in the measurement of the thrust on the bearing.

Dependent upon the nature of the materials and the operating temperature and pressure of the bearing, there may be a tendency for the ring 9 to adhere to the walls of its chamber, whereby a small excess pressure is first required to "unstick" the ring 9 adjacent the nozzle. A typical graph of pressure plotted against displacement when there is a tendency to stick is illustrated in Figure 4, which shows that after reaching a maximum value the pressure falls slightly and then remains constant, and it is this constant pressure which is used to determine the thrust on the bearing. If in any particular case the drop from the maximum pressure value is large with a nozzle in the form of a single jet 19, then it is advisable to employ a plurality of jets or apertures through which pressure is applied to a greater area of the surface of the ring 9; and the porous plug 18 constitutes a convenient form of such a multi-jet nozzle.

Only a minute quantity of fluid sufficient to form a slight pocket in the ring 9 adjacent the orifice need be introduced in order to obtain the desired pressure reading. The fluid used is advantageously lubricting oil of the same kind as that used for lubricating the bearing. However other liquids or air or other gas may be used.

By the construction in accordance with the present invention, simple and efficient means are provided whereby the thrust on the bearing can be ascertained without the necessity of the provision of a special liquid filled chamber subject to the thrust of the bearing.

Although natural or synthetic rubber and other rubber-like materials are the preferred materials for the solid ring 9, other materials which are incompressible and deformable at normal temperatures may be used. Such materials include many elastomers (in addition to the materials normally referred to as "rubber-like"), such as vinyl compounds and similar synthetic resins.

The word "solid body" is used in the specification to distinguish from a "liquid body," and applies to the construction shown in Figure 3 in which a liquid core is provided, but the skin or casing of which is of solid material so that the body of the ring as a whole is "solid" for the purposes of the invention. It has been found that the means for measuring thrust described herein may be applied satisfactorily to material having a Shore hardness of 60 to 70. Material of this hardness is also satisfactory for use as a thrust bearing. However the invention is applicable to materials having a Shore hardness as low as 40 and as high as 80.

What I claim as my invention is:

1. In a thrust bearing particularly for the rotor of a gas turbine engine, a carrier for the non-rotary member of the bearing, a fixed member for the support of the said carrier in the radial direction, a solid body of incompressible material adapted to sustain the axial thrust on the said bearing contained in a chamber formed between the said carrier and the said fixed member and adapted to deform and flow under the pressure exerted thereon, a nozzle in a wall of the said chamber which will permit the flow of fluid but prevent the extrusion of the said material, and a duct for connecting said nozzle to a source of fluid pressure, and a gauge for the measurement of the fluid pressure in said duct.

2. In a thrust bearing particularly for the rotor of a gas turbine engine, a carrier for the non-rotary member of the bearing, a fixed member for the support of the said carrier in the radial direction, a solid body of incompressible material having a liquid filled core adapted to sustain the axial thrust on the said bearing contained in a chamber formed between the said carrier and the said fixed member and adapted to deform and flow under the pressure exerted thereon, a nozzle in a wall of the said chamber which will permit the flow of fluid but prevent the extrusion of the material, a duct for connecting the said nozzle to a source of fluid pressure, and a gauge for the measurement of the fluid pressure in said duct.

3. In a thrust bearing, means forming a chamber a wall of which is displaceable relative to other walls under the axial thrust of the bearing, a solid body of incompressible material which is deformable at normal temperatures contained in said chamber and adapted to sustain said thrust, a nozzle in one of the walls of the said chamber which will permit the flow of fluid but prevent extrusion of the said material, a source of fluid pressure, a duct connecting the said nozzle to the said source of fluid pressure, and means for the measurement of the fluid pressure in the said duct.

4. In a thrust bearing, means forming a chamber a wall of which is displaceable relative to other walls under the axial thrust of the bearing, a solid body of incompressible material which is deformable at normal temperatures contained in said chamber and adapted to sustain said thrust, a duct extending partly through the thickness of one of the walls of the said chamber but terminating short of the chamber itself, a jet connecting the said duct to the said chamber of sufficiently small size to prevent the extrusion of the said material, a fluid pressure pump, a tube connecting the said pump to the said duct, and a gauge for the measurement of the fluid pressure in the said tube.

5. In a thrust bearing, means forming a chamber a wall of which is displaceable relative to other walls under the axial thrust of the bearing, a solid body of incompressible material which is deformable at normal temperatures contained in said chamber and adapted to sustain said thrust, a duct extending through one of the walls of the said chamber, a porous plug filling the opening of the said duct into the said chamber adapted to permit flow of fluid but to prevent extrusion of the said material, a fluid pressure pump, a tube connecting the said pump to the said duct, and a gauge for the measurement of the fluid pressure in the said tube.

6. In a thrust bearing, means forming a chamber a wall of which is displaceable under the axial thrust of the bearing, a solid body of incompressible material which is deformable at normal temperatures and has a Shore hardness of between 60 and 70 contained in said chamber and adapted to sustain said thrust, a nozzle in the wall of the chamber containing the said body which will permit the flow of fluid but prevent the extrusion of the said material, means for applying fluid pressure to the said nozzle, and means for determining when the said pressure balances the pressure in the said body.

References Cited in the file of this patent

UNITED STATES PATENTS

| Number | Name | Date |
|---|---|---|
| 1,297,686 | Hashimoto | Mar. 18, 1919 |
| 1,298,630 | Schmidt | Mar. 25, 1919 |
| 1,316,281 | Dalton | Sept. 16, 1919 |
| 1,347,348 | Macmillan | July 20, 1920 |
| 1,994,388 | Erichsen | Mar. 12, 1935 |
| 2,386,367 | Taylor | Oct. 9, 1945 |